United States Patent
Hwang et al.

(10) Patent No.: US 10,872,255 B2
(45) Date of Patent: Dec. 22, 2020

(54) METHOD OF PROCESSING BIOMETRIC IMAGE AND APPARATUS INCLUDING THE SAME

(71) Applicant: SAMSUNG ELECTRONICS CO., LTD., Suwon-si (KR)

(72) Inventors: Hyoseok Hwang, Suwon-si (KR); Jingu Heo, Yongin-si (KR); Byungkyu Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 152 days.

(21) Appl. No.: 16/059,828

(22) Filed: Aug. 9, 2018

(65) Prior Publication Data
US 2019/0050659 A1    Feb. 14, 2019

(30) Foreign Application Priority Data
Aug. 14, 2017    (KR) .................. 10-2017-0103212

(51) Int. Cl.
*G06K 9/00* (2006.01)
*G06F 21/32* (2013.01)
(Continued)

(52) U.S. Cl.
CPC ......... *G06K 9/00892* (2013.01); *G06F 17/18* (2013.01); *G06F 21/32* (2013.01);
(Continued)

(58) Field of Classification Search
CPC ..... G06F 21/32; G06F 17/18; G06K 9/00013; G06K 9/00067; G06K 9/036; G06K 9/03; G06K 9/6202; G06K 9/00892
See application file for complete search history.

(56) References Cited

U.S. PATENT DOCUMENTS 7,072,523 B2    7/2006  Bolle et al.
9,430,629 B1 *  8/2016  Ziraknejad ............ G06F 16/583
(Continued)

FOREIGN PATENT DOCUMENTS

| KR | 1020120041900 A | 5/2012 |
| KR | 1020150057714 A | 5/2015 |
| KR | 101596298 A | 2/2016 |

OTHER PUBLICATIONS

Communication dated Jan. 24, 2019, issued by the European Patent Office in counterpart European Application No. 18186089.1.
(Continued)

*Primary Examiner* — Margaret G Mastrodonato
(74) *Attorney, Agent, or Firm* — Sughrue Mion, PLLC

(57) ABSTRACT

Provided are a biometric image processing method and an apparatus including the same. The biometric image processing method includes acquiring a biometric image from a biometric sensor, evaluating image quality of the biometric image by calculating an evaluation score with respect to each of a plurality of evaluation items corresponding to the biometric image, determining at least one of an improvement algorithm corresponding to an evaluation result and a weight of the improvement algorithm by using an image quality improvement table including an improvement degree of image quality, and correcting the biometric image according to the at least one of the improvement algorithm and determined weight of the improvement algorithm.

28 Claims, 13 Drawing Sheets

(51) Int. Cl.
  *G06F 17/18* (2006.01)
  *G06K 9/62* (2006.01)
  *G06K 9/03* (2006.01)
(52) U.S. Cl.
  CPC ........... *G06K 9/00013* (2013.01); *G06K 9/03* (2013.01); *G06K 9/6202* (2013.01)

(56) References Cited

U.S. PATENT DOCUMENTS

| | | | |
|---|---|---|---|
| 9,633,273 B2 | 4/2017 | Yoon et al. | |
| 2006/0171571 A1* | 8/2006 | Chan | G06K 9/00885 382/115 |
| 2007/0100622 A1* | 5/2007 | Tavares | G10L 17/06 704/250 |
| 2009/0219154 A1* | 9/2009 | Kukula | G06K 9/036 340/540 |
| 2010/0143575 A1 | 6/2010 | Knaggs | |
| 2014/0002238 A1* | 1/2014 | Taveau | G07C 9/257 340/5.53 |
| 2014/0133711 A1* | 5/2014 | Abe | G06K 9/00067 382/115 |
| 2016/0335495 A1 | 11/2016 | Kim et al. | |
| 2018/0075277 A1 | 3/2018 | Lee | |
| 2019/0057270 A1* | 2/2019 | Heo | G06K 9/00221 |

OTHER PUBLICATIONS

Vatsa, M., et al., "SVM based adaptive biometric image enhancement using quality assessment", 2008, Speech, Audio, Image and Biomedical Signal Processing using Neural Networks, XP055540300, 22 pages total (p. 351-371).

Bharadwaj, S., et al., "Quality assessment based denoising to improve face recognition performance", Jun. 20, 2011, Computer Vision and Pattern Recognition Workshops (CVPRW), 2011 IEEE Computer Society Conference on, IEEE, XP031926596, 6 pages total (p. 140-145).

Yun, E., et al., "Adaptive fingerprint image enhancement with fingerprint image quality analysis", 2006, Image and Vision Computing, vol. 24, No. 1, XP055540311, 10 pages total (p. 101-110).

* cited by examiner

FIG. 16

|         | GRADE 1 (0~20) | GRADE 2 (20~40) | GRADE 3 (40~60) | GRADE 4 (60~80) | GRADE 5 (80~100) |
|---------|----------------|-----------------|-----------------|-----------------|------------------|
| Original | 17.8 | 39.4 | 58.6 | 73.8 | 92.5 |
| WEIGHT 1 | 28.3 | 58.4 | 69.2 | 80.3 | 95.1 |
| WEIGHT 2 | 35.4 | 65.6 | · | · | · |
| WEIGHT 3 | 47.4 | · | · | · | · |
| WEIGHT 4 | · | · | · | · | · |
| WEIGHT 5 | · | · | · | · | · |

METHOD OF PROCESSING BIOMETRIC IMAGE AND APPARATUS INCLUDING THE SAME

CROSS-REFERENCE TO RELATED APPLICATION

This application claims priority from and the benefit of Korean Patent Application No. 10-2017-0103212, filed on Aug. 14, 2017, in the Korean Intellectual Property Office, the disclosure of which is incorporated herein in its entirety by reference.

BACKGROUND

1. Field

The present disclosure relates to methods of processing a biometric image, and apparatuses including the same.

2. Description of the Related Art

Recently, personal authentication using unique features of individuals, such as fingerprints, voices, faces, hands, or irises, is gradually increasing. Personal authentication functions are used in financial instruments, access control systems, mobile apparatuses, notebooks, or the like, and recently, as mobile apparatuses such as smartphones have become more widespread, biometric recognition apparatuses for personal authentication are being used to protect much security information stored in smartphones.

Since biometric recognition images are used for personal authentication, higher image quality than other types of images is necessary. Therefore, it is often the case that an image quality improvement algorithm is applied to such biometric recognition images. In many related art cases, the same image quality improvement algorithm is applied to all images. In general, in the case of a high-quality image, application of an image quality improvement algorithm thereto may be unnecessary, and further, an authentication rate of the high-quality image may even degrade after the image quality improvement algorithm has been applied.

Thus, there is a need to separately apply as many image quality improvement algorithms as necessary according to the states of images, rather than applying the same image quality improvement algorithm collectively to all images.

SUMMARY

Provided are methods of evaluating image quality of a biometric image and correcting the biometric image by selectively applying as many improvement algorithms as necessary, and electronic apparatuses including the same.

Additional aspects will be set forth in part in the description which follows and, in part, will be apparent from the description, or may be learned by practice of the presented embodiments.

According to an aspect of the present disclosure, there is provided a method of processing a biometric image, the method comprising: acquiring a biometric image from a biometric sensor; evaluating image quality of the biometric image by calculating an evaluation score with respect to each of a plurality of evaluation items corresponding to the biometric image, the evaluation score comprising information about an authentication rate; determining at least one of an improvement algorithm corresponding to the evaluation score and a weight of the improvement algorithm by using an image quality improvement table comprising an improvement degree of image quality; and correcting the biometric image according to the at least one of the improvement algorithm and the weight of the improvement algorithm.

The evaluating the image quality of the biometric image may comprise: calculating an evaluation value of the biometric image with respect to each of the plurality of evaluation items, based on a pixel value of the biometric image; and converting the evaluation value into the evaluation score.

The converting of the evaluation value into the evaluation score may comprise: calculating a correlation between the evaluation value and the authentication rate by linear regression.

The authentication rate may be based on a similarity between images which are similar in terms of the evaluation value.

The image quality improvement table may represent an improvement degree according to an evaluation item and an improvement algorithm.

The image quality improvement table may comprise: a first image quality improvement table representing a first improvement degree according to a first evaluation item and a first improvement algorithm; a second image quality improvement table representing a second improvement degree according to the first evaluation item and a second improvement algorithm; a third image quality improvement table representing a third improvement degree according to a second evaluation item and a third improvement algorithm; and a fourth image quality improvement table representing a fourth improvement degree according to the second evaluation item and a fourth improvement algorithm.

The improvement degree maybe subdivided by grade of the evaluation item.

The improvement degree maybe subdivided by weight of the improvement algorithm.

The improvement degree may comprise an expected evaluation score of the biometric image when a particular improvement algorithm of a particular weight is applied to a biometric image having a particular grade of a particular evaluation item.

The determining the at least one of the improvement algorithm corresponding to the evaluation score and the weight of the improvement algorithm may comprise: determining the improvement algorithm based on a comparison between the evaluation score and the improvement degree; and determining the weight of the improvement algorithm by using the image quality improvement table.

The determining of the improvement algorithm may comprise: determining, as the improvement algorithm, an improvement algorithm of the image quality improvement table when an improvement degree corresponding to the evaluation score from the image quality improvement table is equal to the evaluation score or greater than the evaluation score by a first reference value.

The determining of the weight may comprise: determining, as the weight, a weight in a case where a sum or an average of the improvement degree with respect to each evaluation item in the image quality improvement table is a maximum sum or average.

The determining of the at least one of the improvement algorithm and the weight of the improvement algorithm maybe performed when at least one of the evaluation scores with respect to each of the plurality of evaluation items is equal to or smaller than a second reference value.

The method may further comprise: registering the corrected biometric image as an authentication template.

The method may further comprise: authenticating the corrected biometric image by comparing the corrected biometric image with an authentication template.

The biometric image may comprise one of a fingerprint image, an iris image, a sweat gland image, a blood vessel image, and a face image.

Each of the evaluation items may comprise at least one of noise, an artifact related to an object other than a living body, and a region-by-region brightness deviation.

The improvement algorithm may comprise at least one of an algorithm for reducing noise, an algorithm for reducing an artifact, and an algorithm for reducing a region-by-region brightness deviation.

According to an aspect of the present disclosure, there is provided an electronic apparatus comprising: a biometric sensor configured to detect a biometric image from an object; and a processor configured to: acquire the biometric image from the biometric sensor, evaluate image quality of the biometric image by calculating an evaluation score with respect to each of a plurality of evaluation items corresponding to the biometric image, the evaluation score comprising information about an authentication rate, determine at least one of an improvement algorithm corresponding to the evaluation score and a weight of the improvement algorithm by using an image quality improvement table comprising an improvement degree of image quality, and correct the biometric image according to the determined at least one of the improvement algorithm and weight of the improvement algorithm.

The processor maybe further configured to: calculate an evaluation value of the biometric image with respect to each of the plurality of evaluation items based on a pixel value of the biometric image, and convert the evaluation value into the evaluation score.

The processor maybe further configured to: convert the evaluation value into the evaluation score by calculating a correlation between the evaluation value and the authentication rate by linear regression.

The authentication rate maybe based on a similarity between images that are similar in terms of the evaluation value.

The image quality improvement table may represent an improvement degree according to an evaluation item and an improvement algorithm.

The improvement degree maybe subdivided by grade of the evaluation item.

The improvement degree maybe subdivided by weight of the improvement algorithm.

The improvement degree may comprise an expected evaluation score of the biometric image when a particular improvement algorithm of a particular weight is applied to a biometric image having a particular grade of a particular evaluation item.

The processor maybe further configured to: determine the improvement algorithm based on a comparison between the evaluation score and the improvement degree; and determine the weight of the improvement algorithm by using the image quality improvement table.

The processor maybe further configured to: determine, as the improvement algorithm, an improvement algorithm having an improvement degree equal to the evaluation score or greater than the evaluation score by a first reference value in the image quality improvement table.

The processor maybe further configured to: determine, as the weight, a weight in a case where a sum or an average of the improvement degree with respect to each evaluation item in the image quality improvement table is a maximum sum or average.

The processor maybe further configured to: determine the at least one of the improvement algorithm and the weight of the improvement algorithm when at least one of the evaluation scores with respect to each of the plurality of evaluation items is equal to or smaller than a second reference value.

The processor maybe configured to authenticate the corrected biometric image by comparing the corrected biometric image with an authentication template.

The biometric image may comprise one of a fingerprint image, an iris image, a sweat gland image, a blood vessel image, and a face image.

According to another aspect of the present disclosure, there is provided an electronic apparatus comprising: a processor configured to: acquire an image, calculate an evaluation score with respect to one or more evaluation items corresponding to the image, determine an improvement algorithm corresponding to the evaluation score, and correct the image according to the determined improvement algorithm.

The evaluation score may comprise information about an authentication rate.

The processor maybe further configured to: determine a weight of the improvement algorithm by using an image quality improvement table comprising a improvement degree of image quality corresponding to the evaluation score.

The processor maybe further configured to: determine, as the improvement algorithm, an improvement algorithm in an image quality improvement table having an improvement degree corresponding to the evaluation score that is equal to the evaluation score or greater than the evaluation score by a first reference value.

BRIEF DESCRIPTION OF THE DRAWINGS

These and/or other aspects will become apparent and more readily appreciated from the following description of the embodiments, taken in conjunction with the accompanying drawings in which:

FIG. 16 illustrates an example of an image quality improvement table representing a weight-by-weight improvement degree of an improvement algorithm;

DETAILED DESCRIPTION

Figure 1:
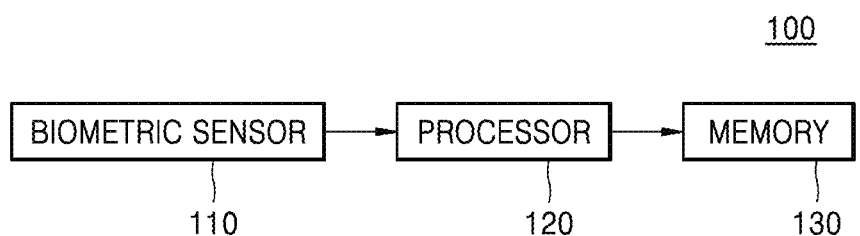
FIG. 1 is a block diagram illustrating an apparatus processing a biometric image, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, biometric image processing methods and apparatuses according to embodiments will be described in detail with reference to the accompanying drawings. The term such as "comprise" or "include" used herein should not be construed as necessarily including all of the elements or operations (or steps) described herein, and should be construed as not including some of the described elements or operations (or steps) or as further including additional elements or operations (or steps).

Although terms such as "first" and "second" may be used herein to describe various elements or components, the elements or components should not be limited by the terms. These terms are only used to distinguish one element or component from another element or component.

FIG. 1 is a block diagram illustrating an apparatus 100 processing a biometric image according to an embodiment. Referring to FIG. 1, the apparatus 100 may include a biometric sensor 110 configured to detect information about an object, for example, a living body of a human, a processor 120 configured to acquire a biometric image from the biometric sensor 110 and perform correction of the acquired biometric image, registration of images, and authentication thereof, and a memory 130 configured to store the biometric image.

The biometric sensor 110 may be an apparatus configured to detect an image of a living body (hereinafter referred to as a biometric image) representing a unique feature difference of each human, and may convert information about a living body into an electrical signal. The biometric image may be any one of a fingerprint image, an iris image, a sweat gland image, a blood vessel image, and a face image. The biometric sensor 110 may vary according to the type of a living body to be detected. When the biometric sensor 110 detects a fingerprint image, the biometric sensor 110 may be referred to as a fingerprint sensor, and when the biometric sensor 110 detects an iris image, the biometric sensor 110 may be referred to as an iris sensor.

When the biometric image is a fingerprint image, the fingerprint sensor may acquire an image of a fingerprint of a finger located on a sensing region. A method by which the fingerprint sensor detects a fingerprint image may vary according to the type of the fingerprint sensor. For example, the fingerprint sensor may detect a biometric image in a manner such as an optical manner, a semiconductor manner, an ultrasonic manner, or a contactless manner.

The optical fingerprint sensor may include, for example, a prism, a light source, a lens, or a charge-coupled device (CCD). In the optical fingerprint sensor, when a fingerprint contacts the prism, the light source may irradiate light to the prism, the lens may collect the light reflected through the prism, and the CCD may detect the collected light as a biometric image. The semiconductor fingerprint sensor may include, for example, a thermal sensor, a capacitive sensor, or an electric field sensor. Since the semiconductor fingerprint sensor may be miniaturized, it may be used in personal application products.

The thermal sensor may be a fingerprint sensor configured to acquire a temperature distribution as a biometric image according to the temperature difference between a contact region and a contactless region of a fingerprint. The capacitive sensor may be a fingerprint sensor configured to acquire a capacitance difference or a charge amount between ridges of a contacting fingerprint as a biometric image. The electric field sensor may be a fingerprint sensor configured to detect a biometric image from a fingerprint contacting a sensor or an electric field formed around a fingerprint.

The above fingerprint sensor may include a plurality of pixels arranged in a matrix form. Each pixel may output a pixel value corresponding to a feature of a fingerprint, for example, a brightness value, and the resolution of a fingerprint image may be determined according to the number of pixels.

When the biometric image is an iris image, the iris sensor may acquire an image of an iris located in a sensing region. The iris sensor may acquire an iris image by detecting light reflected from an eyeball including an iris, for example, infrared light. Other biometric images may also be acquired by using the biometric sensor 110 corresponding thereto. Hereinafter, for convenience of description, a method of processing a fingerprint image among the biometric images will be mainly described.

Meanwhile, the biometric sensor 110 may be configured to include at least a portion of the processor 120 described below. For example, the biometric sensor 110 may include an operation of correcting a biometric image or calculating a feature of a biometric image in addition to an operation of detecting a biometric image. In this case, the biometric sensor 110 may be a functional module including a hardware module and a software module. The biometric sensor 110 may be arranged so as to be exposed on one side of a housing of the electronic apparatus 100.

The processor 120 may drive an operating system and an application program to control a plurality of components connected to the processor 120. The processor 120 may recognize a biometric image of an object acquired from the biometric sensor 110 and may register the recognized biometric image or perform authentication on the object.

For example, in a process of registering biometric information, the processor 120 may encode or convert an acquired biometric image into a particular image through various processes such as a process of converting a grayscale value into a black or white value. Then, for use in a comparison with a subsequent input biometric image, the biometric image may be stored as an authentication template in a security region of the memory 130. Alternatively, in a process of authenticating biometric information, the processor 120 may authenticate an object by comparing an acquired biometric image with a registered authentication template. In this case, the processor 120 may determine a similarity by comparing the acquired biometric image with the registered authentication template. When the similarity is greater than a first reference value, the processor 120 may determine that the authentication has succeeded, and when the similarity is equal to or smaller than the first reference value, the processor 120 may determine that the authentication has failed. Herein, the first reference value may be predefined as a reference value for determining that the biometric image and the authentication template are identical to each other.

Meanwhile, before the registration of biometric information or before the authentication of biometric information, the processor 120 may evaluate image quality of the biometric image and correct the biometric image by applying an improvement algorithm selectively according to the evaluation result. A method of correcting the biometric image will be described later.

The memory 130 may store the biometric image and the like. The memory 130 may temporarily store the biometric image processed by the processor 120 and may store the authentication template necessary for authentication. Alternatively, the memory 130 may store, for example, an improvement algorithm and an image quality improvement table for correcting the biometric image.

Figure 2:
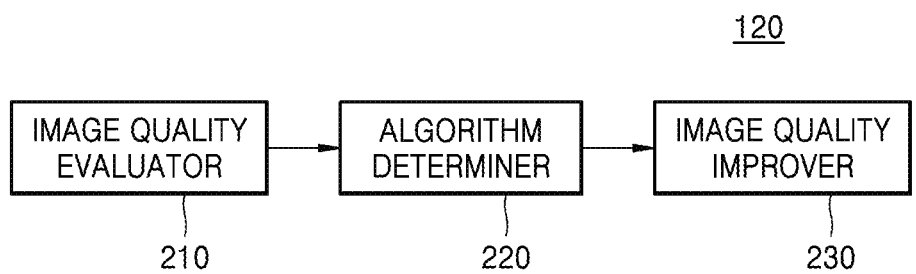
FIG. 2 is a detailed block diagram of a processor illustrated in FIG. 1.
Figure 3:
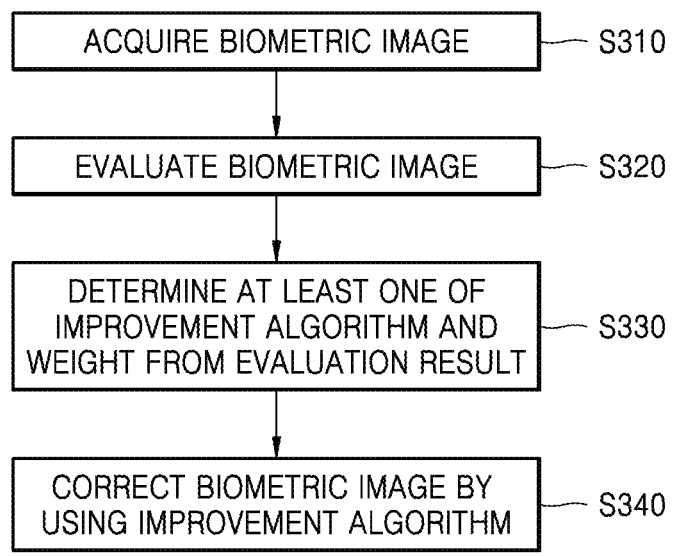
FIG. 3 is a flow diagram illustrating a method by which the processor of FIG. 2 processes a biometric image.

FIG. 2 is a detailed block diagram of the processor 120 illustrated in FIG. 1, and FIG. 3 is a flow diagram illustrating a method by which the processor 120 of FIG. 2 processes a biometric image. As illustrated in FIG. 2, the processor 120 may include an image quality evaluator 210 configured to evaluate image quality of a biometric image, an algorithm determiner 220 configured to determine an improvement algorithm for improving the image quality, and an image quality improver 230 configured to correct the biometric image according to the determined improvement algorithm.

Referring to FIG. 3, the processor 120 may acquire a biometric image from the biometric sensor 110 (S310). The biometric sensor 110 may detect information about a living body of an object to generate a biometric image in the form of an electrical signal. The generated biometric image may be applied to the processor 120, and thus the processor 120 may acquire the biometric image.

The processor 120 may evaluate image quality of the biometric image (S320). For example, the image quality evaluator 210 of the processor 120 may evaluate image quality of the biometric image based on a plurality of evaluation items and calculate an evaluation score of each of the plurality of evaluation items. An evaluation item may be an item representing the type of image quality of the biometric image, and a plurality thereof may be provided. For example, the evaluation item may include noise, an artifact, and/or a region-by-region brightness deviation. The evaluation score may be represented as, for example, a number representing the degree of image quality of the biometric image. For example, the evaluation score may be set such that the image quality of the biometric image is higher as the evaluation score number is higher.

The processor 120 may determine at least one of an improvement algorithm and a weight of the improvement algorithm from the evaluation result of the biometric image (S330). Operation S330 may be performed when at least one of the evaluation scores of each of the plurality of evaluation items is equal to or smaller than a second reference value. Herein, the second reference value may be predefined as an evaluation value of the biometric image requiring correction with respect to each evaluation item. That is, when at least one of the evaluation scores is equal to or smaller than the second reference value that is a score requiring correction, the processor 120 may determine an improvement algorithm and a weight of the improvement algorithm.

The algorithm determiner 220 of the processor 120 may determine an improvement algorithm corresponding to an evaluation score of the evaluation result. In the process of determining the improvement algorithm, the algorithm determiner 220 may use an image quality improvement table including an improvement degree of image quality. The image quality improvement table may include information about an improvement degree of image quality according to an evaluation item and an improvement algorithm. The image quality improvement table may be prestored in the memory 130, or may be generated by the processor 120.

Figures 4, 5:
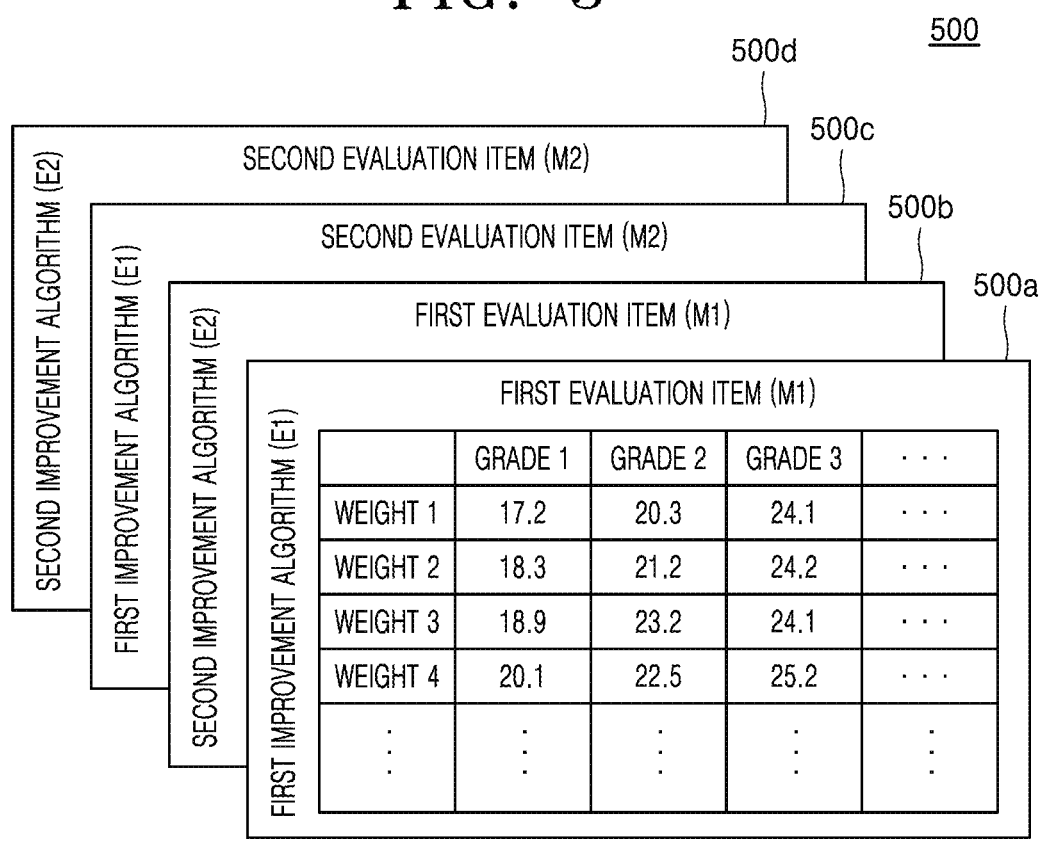
FIG. 4 is a diagram illustrating an example of an image quality improvement table according to an embodiment.
FIG. 5 is a diagram illustrating an example of an image quality improvement table including a plurality of sub image quality improvement tables, according to an embodiment.

FIG. 4 is a diagram illustrating an example of an image quality improvement table 400 according to an embodiment. As illustrated in FIG. 4, the image quality improvement table 400 may include an image quality improvement degree P according to an evaluation item M and an improvement algorithm E. The evaluation item M may be subdivided by grade of the evaluation score, and the improvement algorithm E may be subdivided by weight. The grade of the evaluation score may be defined by grouping the evaluation scores into several groups.

The image quality improvement degree P included in the image quality improvement table 400 may be an evaluation score of a biometric image expected when a particular improvement algorithm E of a particular weight is applied to a biometric image having a particular grade of a particular evaluation item M. For example, in FIG. 4, as for an evaluation score of the evaluation item M, a score of a biometric image expected when the improvement algorithm E is applied as a weight 3 to a biometric image included in a grade 2 is 23.2.

By using the above image quality improvement table, the algorithm determiner 220 may determine the weight of an improvement algorithm or may determine the type and weight of an improvement algorithm. When there is one improvement algorithm, the algorithm determiner 220 may determine only a weight of the improvement algorithm by using the image quality improvement table. In the process of determining the weight, a weight corresponding to an improvement degree of a maximum value in the image quality improvement table may be determined as the weight. For example, in FIG. 4, with respect to a biometric image having a grade 2 of the evaluation item M, a weight 3 that is a weight corresponding to an improvement degree of 23.2 that is a maximum value may be determined as a weight of the improvement algorithm E.

Meanwhile, when there are a plurality of evaluation items, the image quality improvement table may include a plurality of sub image quality improvement tables with respect to each of the plurality of evaluation items. When there are a plurality of improvement algorithms, the image quality improvement table may include a plurality of sub image quality improvement tables with respect to each of the plurality of improvement algorithms. Also, when there are a plurality of evaluation items and a plurality of improvement algorithms, the image quality improvement table may include a plurality of sub improvement tables with respect to each of the plurality of evaluation items and with respect to each of the plurality of improvement algorithms.

FIG. 5 is a diagram illustrating an example of an image quality improvement table 500 including a plurality of sub image quality improvement tables according to an embodiment. As illustrated in FIG. 5, when there are two evaluation items and two improvement algorithms, the image quality improvement table 500 may include a first image quality improvement table 500a representing an improvement degree according to a first evaluation item M1 and a first improvement algorithm E1, a second image quality improvement table 500b representing an improvement degree according to the first evaluation item M1 and a second improvement algorithm E2, a third image quality improvement table 500c representing an improvement degree according to a second evaluation item M2 and the first improvement algorithm E1, and a fourth image quality improvement table 500d representing an improvement degree according to the second evaluation item M2 and the second improvement algorithm E2.

An image quality improvement degree may be an evaluation score of a biometric image expected when a particular improvement algorithm of a particular weight is applied to a biometric image having a particular evaluation score of a particular evaluation item. For example, as for an evaluation score of the first evaluation item M1, a score of a biometric image expected when the first improvement algorithm E1 is applied as a weight 3 to a biometric image included in an evaluation score 2 is 23.5.

When there are a plurality of improvement algorithms, the algorithm determiner 220 may determine the type and weight of an improvement algorithm. The algorithm determiner 220 may determine all improvement algorithms included in the image quality improvement table 500 as an improvement algorithm to be applied to a biometric image, or may determine some improvement algorithms as an improvement algorithm to be applied to a biometric image. When a difference between an improvement degree included in the image quality improvement table 500 and an evaluation score is equal to or greater than a third reference value, the algorithm determiner 220 may determine an improvement algorithm of the image quality improvement table 500 as an improvement algorithm to be applied to a biometric image. Herein, the third reference value may be predefined as a reference value for determining that an image quality of a biometric image is improved by applying an improvement algorithm. The third reference value may be defined differently for each evaluation item. If a difference between an improvement degree and an evaluation score is smaller than the third reference value, even when an improvement algorithm is applied, an image quality may not be improved and a load increase may even occur in signal processing. Therefore, for the efficiency of signal processing and to improve the functioning of the processor, the improvement algorithm may not be applied.

For example, the third reference value may be assumed to be 0.5 when the algorithm determiner 220 determines an improvement algorithm from the image quality improvement table 400 of FIG. 4. When an evaluation score of the evaluation item M with respect to a biometric image is 25 as a grade 3, since an improvement degree of the improvement algorithm E of FIG. 4 is equal to or smaller than 25.5, the algorithm determiner 220 may not determine the improvement algorithm E of the image quality improvement table M of FIG. 4 as an improvement algorithm. In other words, since the difference between the improvement degree, which is 25.2 corresponding to relevant weight 4, and the evaluation score, which is 25, is equal to or smaller than the reference value, which is 0.5, the algorithm determiner 220 may not determine the improvement algorithm E of the image quality improvement table M of FIG. 4 as an improvement algorithm. However, when an evaluation score of an evaluation item with respect to a biometric image is 10 as a grade 1, since an improvement degree of the improvement algorithm E of FIG. 4 is equal to or greater than 17.2, the algorithm determiner 220 may determine the improvement algorithm E of the image quality improvement table M of FIG. 4 as an improvement algorithm.

When the improvement algorithm is determined, the algorithm determiner 220 may determine a weight of the determined improvement algorithm. When there is one evaluation item, the algorithm determiner 220 may determine a weight in the case of an improvement degree corresponding to an evaluation score of the image quality improvement table being maximum as a weight of the improvement algorithm. For example, when an evaluation score is a grade 2 in the image quality improvement table M of FIG. 4, the algorithm determiner 220 may determine a weight 3 as a weight of the improvement algorithm E.

When there are a plurality of evaluation items, the algorithm determiner 220 may determine a weight in the case of the sum or average of the improvement degrees corresponding to an evaluation score of each evaluation item in the image quality improvement table being maximum as a weight of the improvement algorithm. The sum or average of the improvement degrees corresponding to an evaluation score of each evaluation item will be described later.

The processor 120 may correct the biometric image by using the improvement algorithm (S340). When the weight is determined, the image quality improver 230 of the processor 120 may correct the biometric image by the improvement algorithm of the determined weight.

Hereinafter, a method of evaluating an image quality of a biometric image will be described in detail.

The image quality evaluator 210 may output an individual evaluation score by evaluating an image quality of an input image with respect to each evaluation item. In the process of calculating an evaluation score, the image quality evaluator 210 may calculate an evaluation value of an evaluation item of a biometric image and convert the evaluation value into an evaluation score including information about an authentication rate. Herein, the evaluation value may be a value calculated based on a pixel value of a biometric image, for example, a brightness value, and the authentication rate may be a value calculated based on a similarity between images with similar evaluation values. Thus, since an evaluation score includes not only a pixel value but also information about an authentication rate, not only an image quality of a biometric image but also an authentication rate may be predicted from the evaluation score. The evaluation score may be represented as a number, and the evaluation score may be defined as being higher as the authentication rate is higher.

Figure 6:
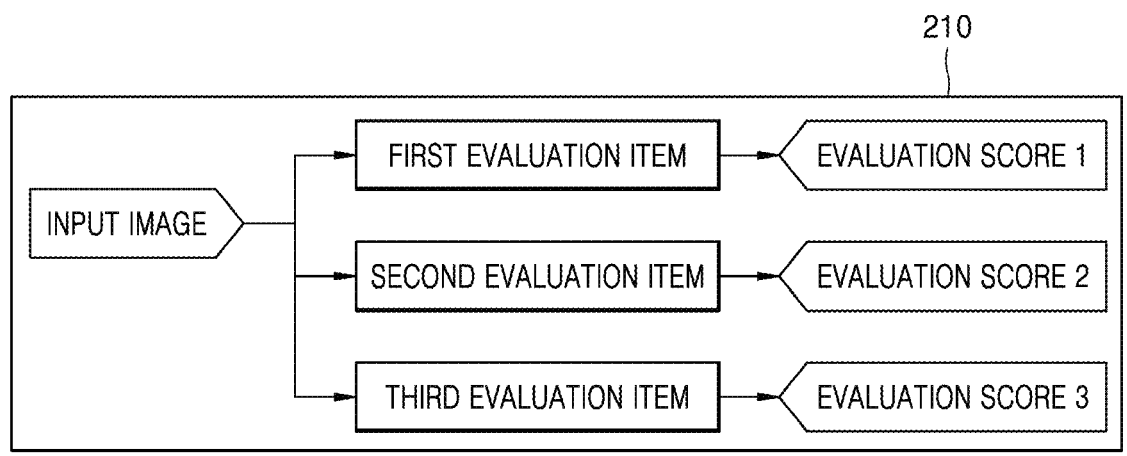
FIG. 6 is a reference diagram illustrating an example of a function of an image quality evaluator.

There may be two or more evaluation items, and an evaluation score may be calculated with respect to each evaluation item. FIG. 6 is a reference diagram illustrating an example of a function of the image quality evaluator 210. As illustrated in FIG. 6, the image quality evaluator 210 may evaluate a biometric image, for example, a fingerprint image by three evaluation items. The image quality evaluator 210 may calculate an evaluation score with respect to each of the three evaluation items. The evaluation item may be, for example, a noise, an artifact, or a brightness deviation.

Figure 7A:
FIG. 7A illustrates an example of a fingerprint image with low noise.
Figure 7B:
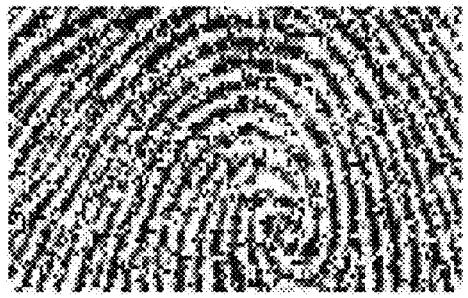
FIG. 7B illustrates an example of a fingerprint image with high noise.

First, the image quality evaluator 210 may evaluate a noise as a first evaluation item. FIG. 7A illustrates an example of a fingerprint image with a low noise, and FIG. 7B illustrates an example of a fingerprint image with a high noise. As illustrated in FIG. 7B, a fingerprint image with a high noise may have a low authentication rate. Thus, the processor 120 may evaluate a noise as an evaluation item of an image quality of a biometric image and apply an improvement algorithm to a biometric image with a low evaluation score.

The image quality evaluator 210 may calculate an evaluation value $M_n$ of a noise of a biometric image as in Equation 1 below.

$$M_n = c_n(\Sigma_{i=1}^{N}(\Delta_i + \nabla_i)) \quad \text{Equation 1}$$

Herein, N denotes the total number of pixels, and i denotes the first pixel to last pixels. $\Delta$ denotes a primary differential value of a brightness value of the ith pixel, and $\nabla$ denotes a secondary differential value of a brightness value of the ith pixel. $c_n$ denotes a coefficient. The image quality evaluator 210 may evaluate that there is more noise as the evaluation value of a noise is greater.

Figure 8A:
FIG. 8A illustrates an example of a fingerprint image with few artifacts.
Figure 8B:
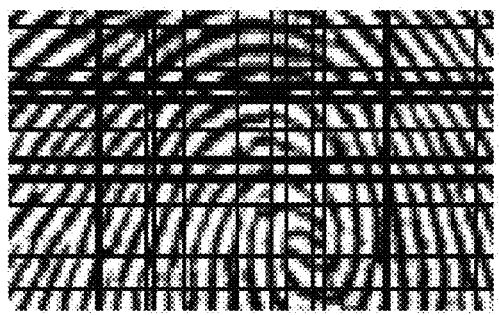
FIG. 8B illustrates an example of a fingerprint image with many artifacts.

The image quality evaluator 210 may evaluate an artifact as a second evaluation item. Herein, the artifact may represent another shape other than the shape of a living body in a biometric image. FIG. 8A illustrates an example of a fingerprint image with a low artifact, and FIG. 8B illustrates an example of a fingerprint image with a high artifact. As illustrated in FIG. 8B, another pattern other than a fingerprint, for example, a grid-type pattern may be further included in the fingerprint image. When an artifact other than a fingerprint shape is included in the fingerprint image, an authentication rate may decrease even in the case of the same fingerprint. Thus, a biometric image with a high artifact may need to be corrected.

In order to evaluate an artifact, the image quality evaluator 210 may first calculate an average value of the brightness of pixels in row and column directions of a biometric image. The biometric image may include C×R pixels, where C represents columns and R represents rows. When an average value of the brightness of pixels in the row direction is denoted by a row vector $V^R$ and an average value of the brightness of all pixels in the column direction is denoted by a column vector $V^C$, the image quality evaluator 210 may calculate an evaluation value of an artifact $M_a$ as in Equation 2 below.

$$M_a = \sum_{i=1}^{R}(\Delta V_i^c + \nabla V_i^c) + \sum_{i=1}^{c}(\Delta V_i^R + \nabla V_i^R) \quad \text{Equation 2}$$

Herein, $\Delta V_i^c$ denotes a primary differential value of $V^C$ of the ith column, $\Delta V_i^R$ denotes a primary differential value of $V^R$ of the ith row, $\nabla V_i^c$ denotes a secondary differential value of $V^C$ of the ith column, and $\Delta V_i^R$ denotes a secondary differential value of $V^R$ of the ith row. There may be more artifact as the evaluation value of an artifact is greater.

Figure 9A:
FIG. 9A illustrates an example of a fingerprint image with a low brightness deviation.
Figure 9B:
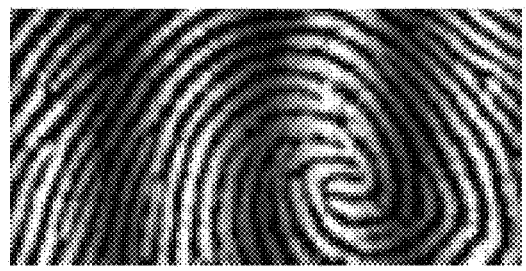
FIG. 9B illustrates an example of a fingerprint image with a high brightness deviation.

The image quality evaluator 210 may evaluate a brightness deviation as a third evaluation item. Herein, the brightness deviation may represent a brightness deviation of a plurality of regions into which a biometric image is divided. FIG. 9A illustrates an example of a fingerprint image with a low brightness deviation, and FIG. 9B illustrates an example of a fingerprint image with a high brightness deviation. As illustrated in FIG. 9B, when a brightness deviation of the fingerprint image is high, authentication may fail even in the case of the same fingerprint. Thus, a biometric image with a high brightness deviation may need to be corrected.

The image quality evaluator 210 may divide an image into M×N regions, calculate an average brightness value $P_{ij}$ of each region, and define the average of a standard deviation of the average brightness value $P_{ij}$ of each region as an evaluation value $M_i$ of the brightness deviation as in Equation 3 below.

$$M_l = \frac{1}{MN}\sum_{i=1}^{M}\sum_{j=1}^{N} stdev(P_{ij}) \quad \text{Equation 3}$$

The image quality evaluator 210 may evaluate that a brightness deviation of each region is greater as an evaluation value of the brightness deviation is greater.

Meanwhile, the image quality evaluator 210 may convert the evaluation value into an evaluation score including information about an authentication rate. An evaluation value of the biometric image may be calculated as described above, and an authentication rate may be calculated by the similarity between biometric images. Therefore, each biometric image may have an evaluation value and an authentication rate. The image quality evaluator 210 may calculate a correlation ($\beta_0$ m, $\beta_1$) between an evaluation value and an authentication rate by linear regression as in Equation 4 below.

$$(\beta_0, \beta_1) = \arg\min_{\beta_0, \beta_1} \sum_{i=1}^{N} \|s_i - \beta_0 - \beta_1 m_i\|^2 \quad \text{Equation 4}$$

Herein, $m_i$ denotes an evaluation value of a particular item, and $s_i$ denotes an authentication rate of the biometric image.

By the parameters $\beta_0$, $\beta_1$ included in Equation 4, the image quality evaluator 210 may convert an evaluation value m into an evaluation score m' as in Equation 5 below.

$$m' = \beta_0 + \beta_1 m \quad \text{Equation 5}$$

The image quality evaluator 210 may calculate an evaluation score with respect to each evaluation item of the biometric image.

As shown above, the reason for converting an evaluation value into an evaluation score is as follows. First, not only an image quality of the biometric image but also an authentication rate of the biometric image may be predicted by representing a result about an evaluation item as an evaluation score instead of an evaluation value. Thus, in the process of developing an algorithm of the processor 120 and the biometric sensor 110, an authentication rate may be predicted by testing only a few images without securing an actual data set. Therefore, the time taken to develop an algorithm of the sensor 110 and the processor 120 may be reduced. Second, in the process of generating an image quality improvement table, an image quality of an improved biometric image may be evaluated to provide a correlation between an evaluated score and an authentication rate.

By using the evaluation scores calculated by the image quality evaluator 210, the algorithm determiner 220 may determine an improvement algorithm to be performed on an image and a weight of the improvement algorithm. In the process of determining an improvement algorithm and a weight of the improvement algorithm, the algorithm determiner 220 may refer to an image quality improvement table. The image quality improvement table may be prestored in the memory 130, or may be generated by the processor 120.

As described above with reference to FIGS. 4 and 5, the image quality improvement table may include information about an improvement degree of an image quality according to an evaluation item and an improvement algorithm. The evaluation item of the image quality improvement table may be subdivided by grade, and the improvement algorithm may also be subdivided by weight. The grade of the evaluation score may be defined by grouping the evaluation scores into several groups. An image quality improvement degree may be an evaluation score of a biometric image expected when a particular improvement algorithm of a particular weight is applied to a biometric image having a particular grade of a particular evaluation item.

By using the image quality improvement table, the algorithm determiner 220 may determine the weight of an improvement algorithm or may determine the type and weight of an improvement algorithm.

Figure 10:
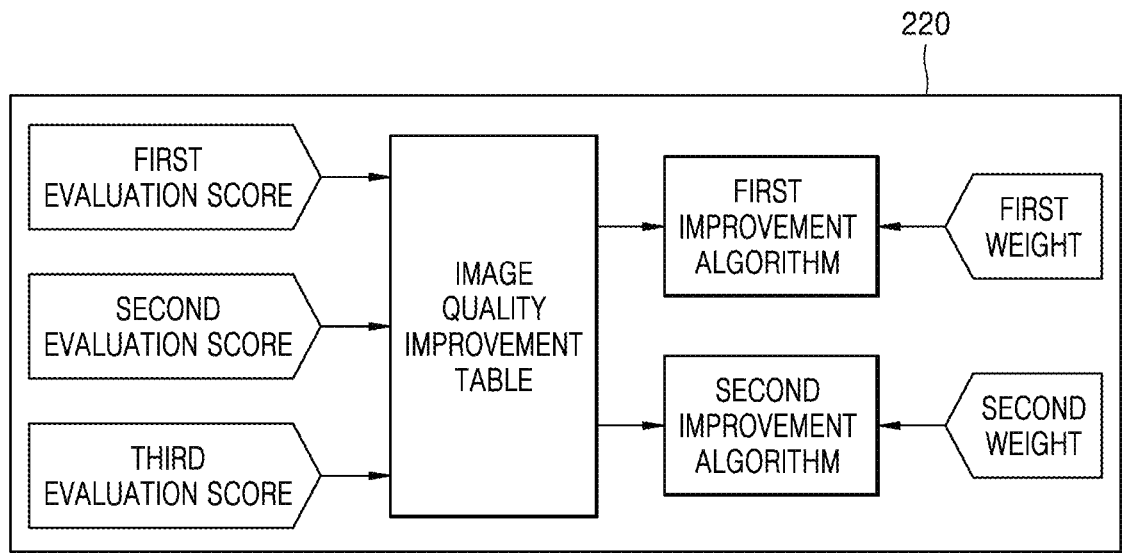
FIG. 10 is a reference diagram schematically illustrating a function of an algorithm determiner.

FIG. 10 is a reference diagram schematically illustrating a function of the algorithm determiner 220. As illustrated in FIG. 10, based on an image quality improvement table, the algorithm determiner 220 may determine an improvement algorithm corresponding to evaluation scores and a weight of the improvement algorithm. In FIG. 10, three evaluation items and two improvement algorithms are illustrated. This means that the algorithm determiner 220 has determined two improvement algorithms from an image quality improvement table based on an evaluation score evaluated by three evaluation items. The number of evaluation items and the number of improvement algorithms may not necessarily be equal to each other and may be different from each other.

Meanwhile, the image quality improvement table may include a plurality of sub image quality improvement tables according to the number of evaluation items and improvement algorithms. For example, when the number of evaluation items is n and the number of improvement algorithms is m, the image quality improvement table may include n×m sub image quality improvement tables.

The algorithm determiner 220 may determine an improvement algorithm to be applied to a biometric image and may determine a weight of the determined improvement algorithm. When there is one improvement algorithm, the algorithm determiner 220 may determine a weight of the improvement algorithm by using the image quality improvement table. In the process of determining the weight, a weight having an improvement degree of a maximum value corresponding to an evaluation score may be determined as the weight.

When there are a plurality of improvement algorithms, the algorithm determiner 220 may determine the type and weight of an improvement algorithm. The algorithm determiner 220 may determine all improvement algorithms included in the image quality improvement table as an improvement algorithm to be applied to the biometric image. Also, a weight in the case of the sum or average of the improvement degrees corresponding to an evaluation score of each evaluation item being maximum may be determined as a weight of each improvement algorithm.

Alternatively, the algorithm determiner 220 may determine some improvement algorithms among the improvement algorithms included in the image quality improvement table as an improvement algorithm to be applied to the biometric image. For example, when a difference between an improvement degree included in the image quality improvement table and an evaluation score is equal to or greater than a third reference value, the algorithm determiner 220 may determine an improvement algorithm of the image quality improvement table as an improvement algorithm to be applied to the biometric image. Herein, the third reference value may be predefined as a reference value for determining that an image quality of the biometric image is improved by applying the improvement algorithm.

When the improvement algorithm is determined, the algorithm determiner 220 may determine a weight of the determined improvement algorithm. When there is one evaluation item, the algorithm determiner 220 may determine a weight in the case of an improvement degree corresponding to an evaluation result of the image quality improvement table being maximum as a weight of the improvement algorithm. When there are a plurality of evaluation items, the algorithm determiner 220 may determine a weight in the case of the sum or average of the improvement degrees of each evaluation item corresponding to an evaluation result of the image quality improvement table being maximum as a weight of the improvement algorithm.

Figure 11:
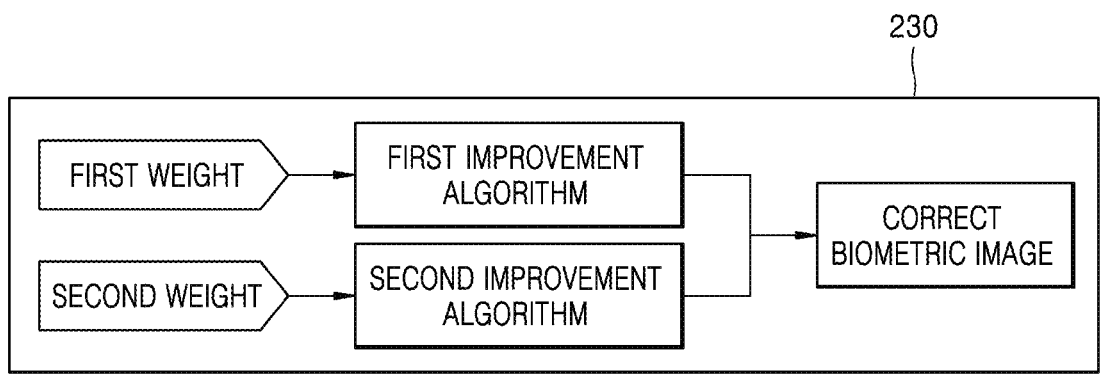
FIG. 11 is a reference diagram schematically illustrating a function of an image quality improver.

Referring back to FIG. 2, the image quality improver 230 may improve an image quality of the biometric image by correcting the biometric image by using the improvement algorithm and the weight of the improvement algorithm determined by the algorithm determiner 220. FIG. 11 is a reference diagram schematically illustrating a function of an image quality improver 230. As illustrated in FIG. 11, the image quality improver 230 may correct the biometric image by applying the determined improvement algorithm with the determined weight. When there are a plurality of improvement algorithms, the image quality improver 230 may apply the improvement algorithms sequentially one by one. However, the inventive concept is not limited thereto. The image quality improver 230 may evaluate an image quality of the biometric image whenever applying the improvement algorithm, and may not apply the other improvement algorithms when an evaluation score is equal to or greater than a second reference value. Herein, the second reference value may be an evaluation score about an image quality of the biometric image and may be predefined as a reference value for determining whether it is necessary to apply the improvement algorithm.

Next, a method of applying an improvement algorithm to a biometric image will be described.

The image quality improver 230 may apply a noise reducing algorithm as a first improvement algorithm E1 to a biometric image. For example, the image quality improver 230 may reduce a noise of the biometric image by applying a bilateral filter or a median filter. In the process of reducing the noise, a weight may be given to the first improvement algorithm E1. For example, when the image quality improver 230 applies a bilateral filter, a weight may be given to the bilateral filter by adjusting a standard deviation or a size of a Gaussian kernel of the filter by the weight.

Thereafter, the image quality improver 230 may apply an artifact reducing algorithm as a second improvement algorithm to a biometric image. The second improvement algorithm may be divided into a process of detecting a line forming an artifact and a processing of restoring the line. Line detection is a process of finding a line artifact in a biometric image, and line restoration is a process of removing the artifact by using the peripheral pixel values of the detected line. A fourth reference value in the process of line detection may be defined by a weight. Herein, the fourth reference value may be predefined as a reference value for determining whether it is necessary to apply an artifact reducing algorithm. For example, the fourth reference value may be inversely proportional to the weight. Therefore, when the weight is increased to set the fourth reference value to be low, an artifact in the biometric image may be further reduced.

Next, the image quality improver 230 may apply a brightness deviation reducing algorithm as a third improvement algorithm to a biometric image. The image quality improver 230 may calculate an average μ and a standard deviation a about all pixels of the biometric image. Then, the image quality improver 230 may calculate an average $\mu_c$ and a standard deviation $\sigma_c$ about pixels of each row in the biometric image and normalize the above values as in Equation 6 below.

$$\hat{I} = \frac{I - \mu_c}{\sigma_c} \quad \text{Equation 6}$$

Then, the image quality improver 230 may denormalize an average $\mu_c$ and a standard deviation $\sigma_c$ about the pixels of each row as an average μ and a standard deviation σ of all the pixels as in Equation 7 below.

$$I' = \hat{I}\sigma + \mu \quad \text{Equation 7}$$

Herein, I denotes a pixel value of the biometric image, and Î denotes a value normalized with an average and a standard deviation of a row to which the corresponding pixel belongs. I' denotes a value denormalized with an overall average and a standard deviation.

As above, the image quality improver 230 may normalize a pixel value of the biometric image with an average and a standard deviation of pixels of each row in the biometric image and then normalize the result with an average and a standard deviation of all the pixels to reduce a brightness deviation about a row of the biometric image.

In the same way, the image quality improver 230 may reduce a brightness deviation about a column of the biometric image. In detail, the image quality improver 230 may calculate an average $\mu_r$ and a standard deviation $\sigma_r$ of each column in the biometric image and normalize the above values as in Equation 8 below.

$$\hat{I} = \frac{I' - \mu_r}{\sigma_r} \quad \text{Equation 8}$$

Then, the image quality improver 230 may denormalize an average μ and a standard deviation σ of the pixels as in Equation 9 below.

$$I'' = \hat{I}\sigma + \mu \quad \text{Equation 9}$$

As above, the image quality improver 230 may normalize a pixel value of the biometric image with an average and a standard deviation of pixels of each column and then normalize the result with an average and a standard deviation of all the pixels to reduce a brightness deviation about a column of the biometric image.

According to an embodiment, the order of operation of the first, second and third improvement algorithms by the image quality improver 230 may vary.

Figure 12A:
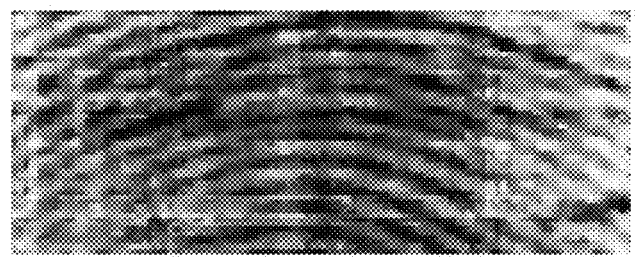
FIGS. 12A to 12C are reference diagrams illustrating an example of application of an algorithm for reducing a brightness deviation, according to an embodiment.
Figure 12B:
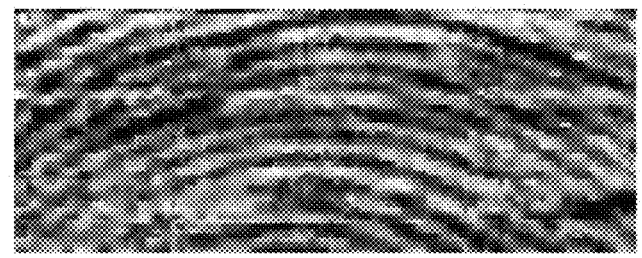
Figure 12C:
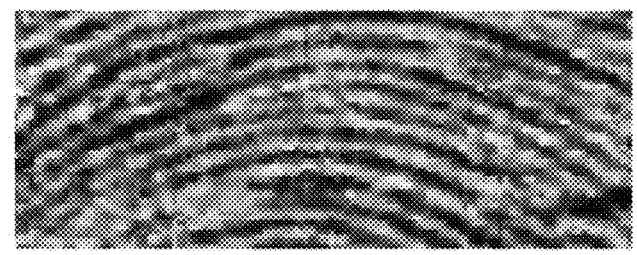

FIGS. 12A to 12C are reference diagrams illustrating an application example of an algorithm reducing a brightness deviation according to an embodiment. FIG. 12A illustrates an original fingerprint image and FIG. 12B illustrates a fingerprint image with an improved row-by-row brightness deviation, wherein it may be seen that a horizontal brightness deviation of FIG. 12B is reduced in comparison with a brightness deviation of the fingerprint image illustrated in FIG. 12A. FIG. 12C illustrates a fingerprint image with an improved column-by-column brightness deviation, wherein it may be seen that a vertical brightness deviation of FIG. 12C is reduced in comparison with a brightness deviation of the fingerprint image illustrated in FIG. 12B.

As described above, the image quality may be improved more effectively by applying the improvement algorithms adaptively according to the evaluation scores or by applying the same improvement algorithm with different weights according to the evaluation scores.

Also, since a biometric image according to an embodiment is used for authentication, it may increase an image quality, and since an image quality of the biometric image is evaluated by using an evaluation score related to an authentication rate, an authentication rate of the biometric image to which the improvement algorithm is applied may be increased.

Figure 13:
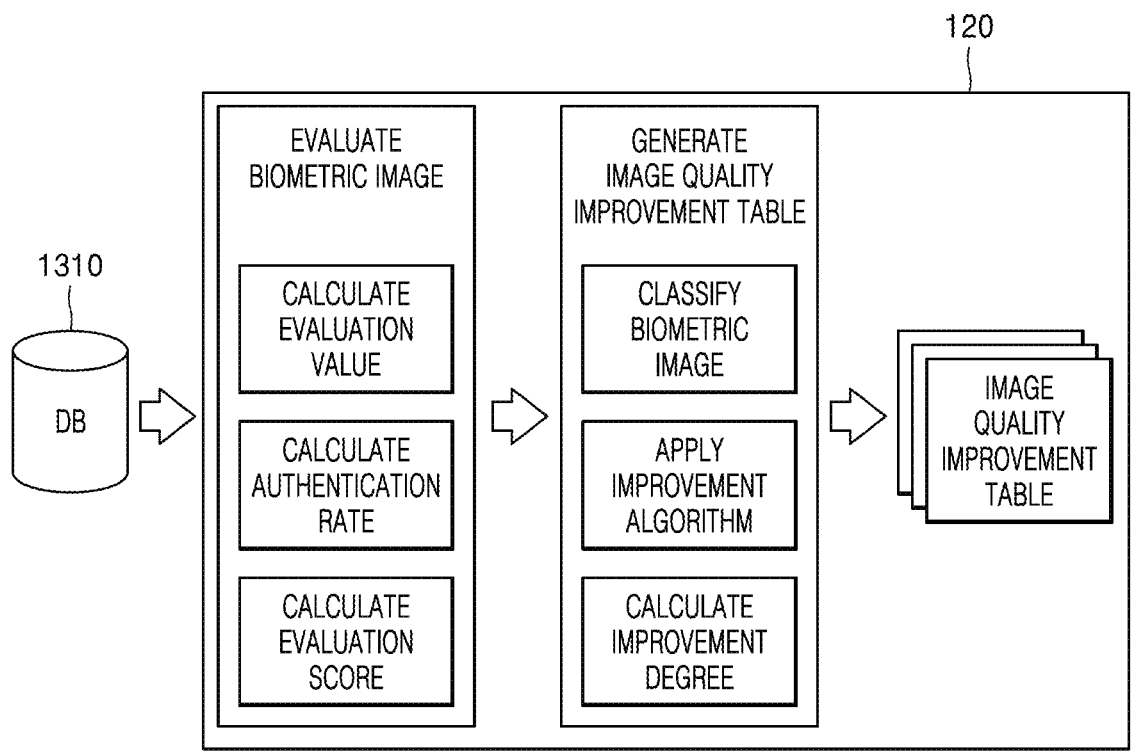
FIG. 13 is a reference diagram illustrating a process of generating an image quality improvement table, according to an embodiment.
Figure 14A:
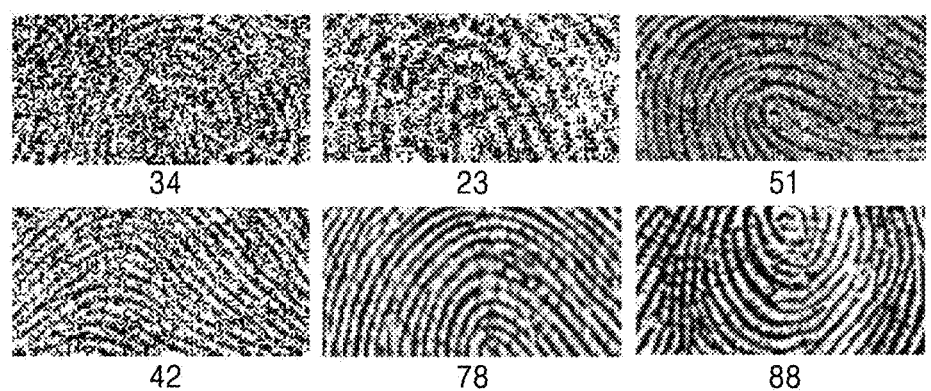
FIGS. 14A to 14C are reference diagrams illustrating an example of an evaluation value applied with respect to each evaluation item.
Figure 14B:
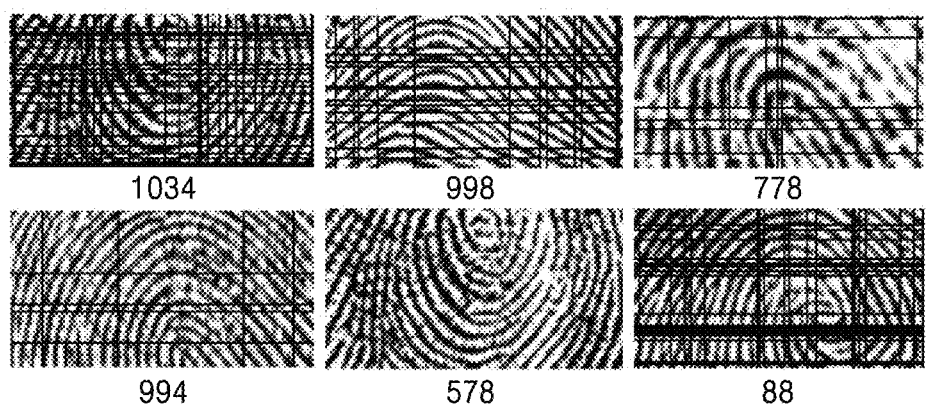
Figure 14C:
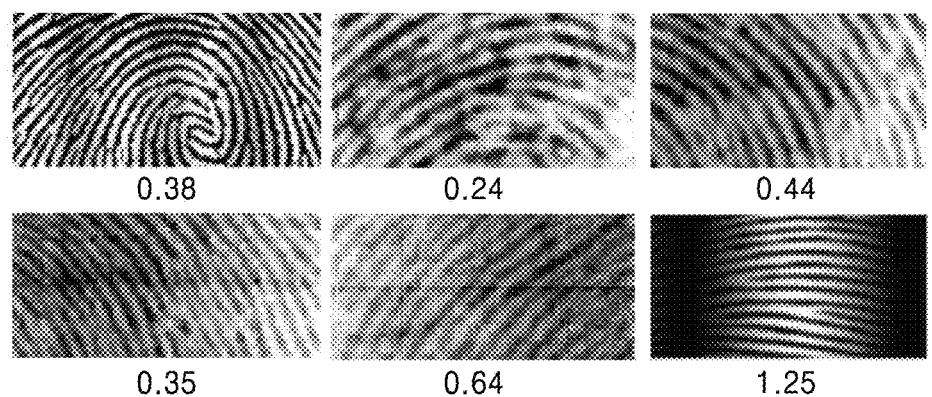

Meanwhile, the image quality improvement table may be prestored in the memory 130, or may be generated by the processor 120. FIG. 13 is a reference diagram illustrating a process of generating an image quality improvement table according to an embodiment. Referring to FIG. 13, the processor 120 may evaluate an image quality of all biometric images in a database (DB) 1310 for learning and may calculate an evaluation value thereof. The above evaluation value may be calculated in the same way as in the above method of evaluating an image quality with respect to each evaluation item by the image quality evaluator 210 of the processor 120. FIGS. 14A to 14C are reference diagrams illustrating an example of an evaluation value applied with respect to each evaluation item. FIG. 14A is a reference diagram illustrating a result of evaluating a biometric image by a noise that is an evaluation item, FIG. 14B is a reference diagram illustrating a result of evaluating a biometric image by an artifact that is an evaluation item, and FIG. 14C is a reference diagram illustrating a result of evaluating a biometric image by a brightness deviation that is an evaluation item.

Also, the processor 120 may calculate an authentication rate about all biometric images. The authentication rate may be represented by a false-reject ratio. The false-reject ratio may be calculated by evaluating a true/false with respect to a data set of an entire image and then measuring how accurate the result thereof is.

Alternatively, the authentication rate may be calculated by a matching similarity indicating how similar two biometric images are. For example, the authentication rate may be calculated based on a normalized cross correlation between two images.

Since all the biometric images have an evaluation value and an authentication rate, the processor 120 may convert an evaluation value into an evaluation score by calculating a correlation between the evaluation value and the authentication rate by linear regression. A method of converting the evaluation value into the evaluation score has been described above in the evaluation score calculating method of the image quality evaluator 210. The processor 120 may calculate an evaluation score with respect to each evaluation item.

With respect to all the biometric images, the processor 120 may classify the biometric images with respect to each evaluation item based on the evaluation scores. For example, when they are classified into 10 grades with respect to M1 (noise), a first grade may be classified as image quality scores 0~10, a second grade may be classified as image quality scores 11~20, and the like. After completion of the classification, the processor 120 may generate a column vector equal to the number of grades of evaluation items.

Figure 15:
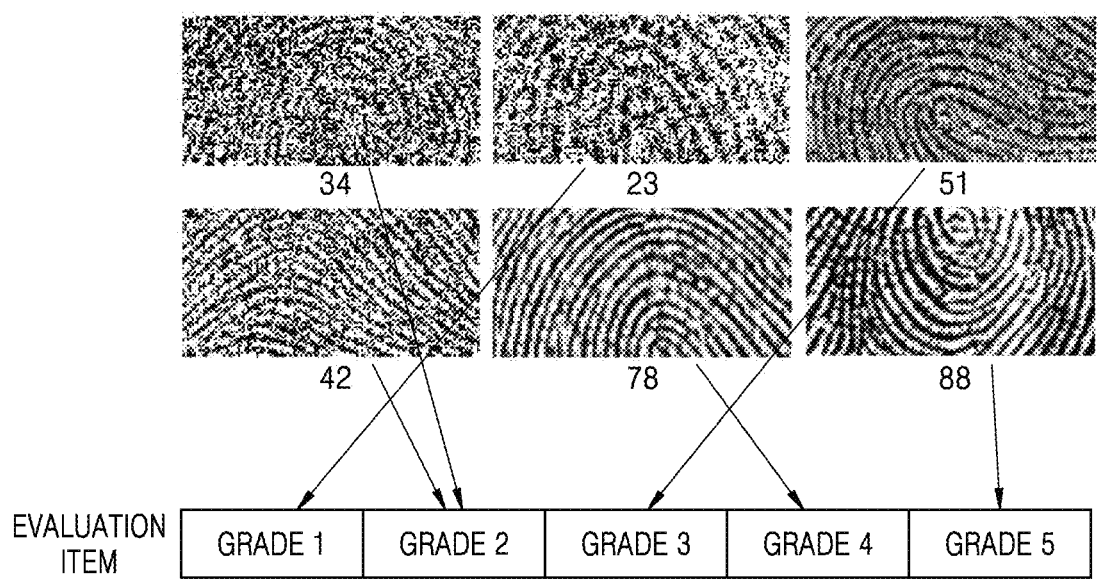
FIG. 15 is a reference diagram illustrating a method of classifying grades according to evaluation scores, according to an embodiment.

FIG. 15 is a reference diagram illustrating a method of classifying grades according to evaluation scores according to an embodiment. The processor 120 may evaluate a biometric image with respect to an evaluation item, for example, a noise. A number written below each fingerprint image of FIG. 15 is an evaluation score. A process may classify each biometric image as a grade based on an evaluation score.

Then, the processor 120 may apply an improvement algorithm of different weights to each of the classified biometric images. With respect to the biometric image with an improvement algorithm applied thereto, the processor 120 may again calculate an improvement degree with respect to each grade of an evaluation item. An evaluation score of the biometric image with an improvement algorithm applied thereto is an improvement degree. When there are a plurality of biometric images in the same grade, an average of the evaluation scores of the plurality of biometric images may be an improvement degree.

FIG. 16 illustrates an example of an image quality improvement table representing a weight-by-weight improvement degree of an improvement algorithm. In the image quality improvement table illustrated in FIG. 16, an x axis represents a grade of an evaluation item, and a y axis represents a weight of an improvement algorithm. The processor 120 may continue to update the image quality improvement table by applying a particular improvement algorithm of a particular weight to a biometric image having a particular grade of a particular evaluation item and then supplementing an improvement degree by an evaluation score obtained by evaluating an applied biometric image by a particular evaluation item.

Figure 17:
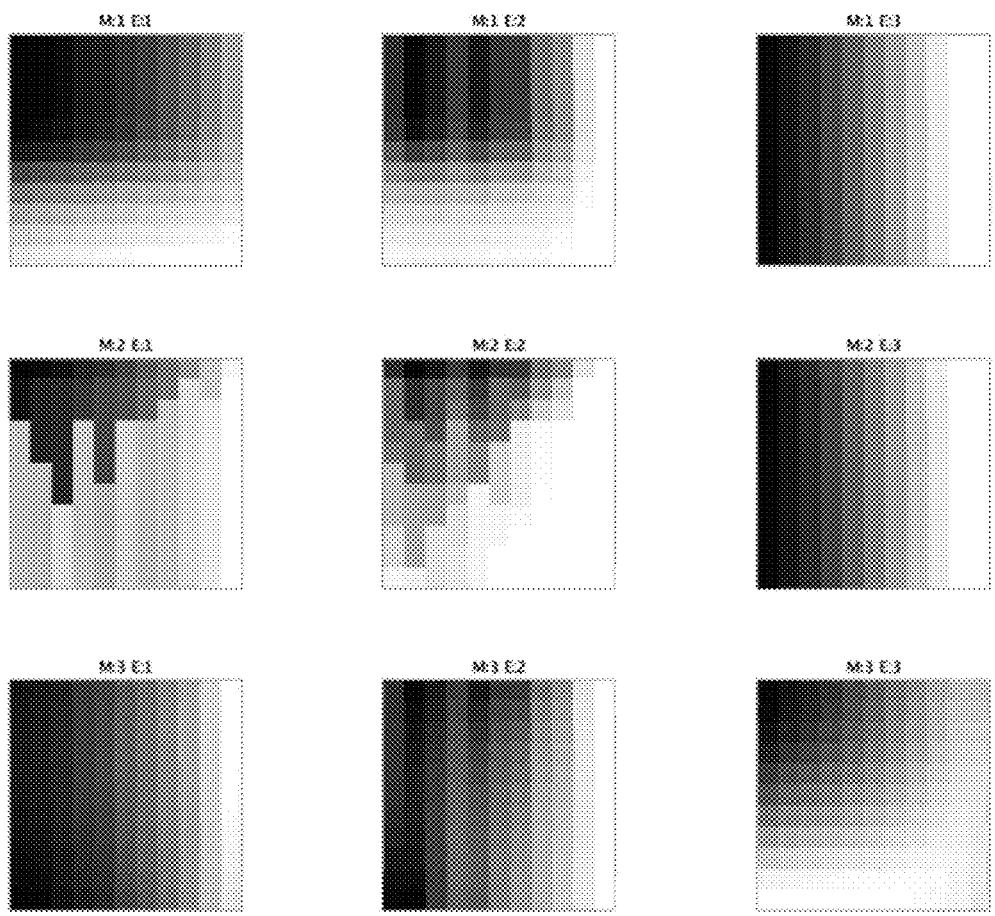
FIG. 17 is a diagram illustrating an example of an image quality improvement table according to three evaluation items and three improvement items.

Consequently, when there are m evaluation items and n improvement algorithms, the processor 120 may generate m×n sub image quality improvement tables. FIG. 17 is a diagram illustrating an example of an image quality improvement table according to three evaluation items and three improvement items. In the image quality improvement table, an evaluation score is normalized with 0~1 to be represented as a brightness value. For example, a brighter value is used as an evaluation score is greater. M denotes an evaluation item, and E denotes an improvement algorithm. An X axis represents a grade of an evaluation item, and a Y axis represents a weight value of an improvement algorithm. The processor 120 may generate the same image quality improvement table as in FIG. 16.

Next, a method of correcting a biometric image by using the above image quality improvement table will be described. First, when a biometric image is input, the processor 120 may calculate an evaluation score for each evaluation item with respect to the biometric image. Then, an improvement algorithm and a weight of the improvement algorithm may be determined by using the image quality improvement table. For example, since the biometric image is evaluated by each of three evaluation items M1, M2, and M3, the evaluation scores of the respective evaluation items may be grades 4, 5, and 6. The processor 120 may refer to a column of the grade 4 in a sub image quality improvement table with an evaluation item M1, may refer to a column of the grade 5 in a sub image quality improvement table with an evaluation item M2, and may refer to a column of the grade 6 in a sub image quality improvement table with an evaluation item M3.

Figure 18:
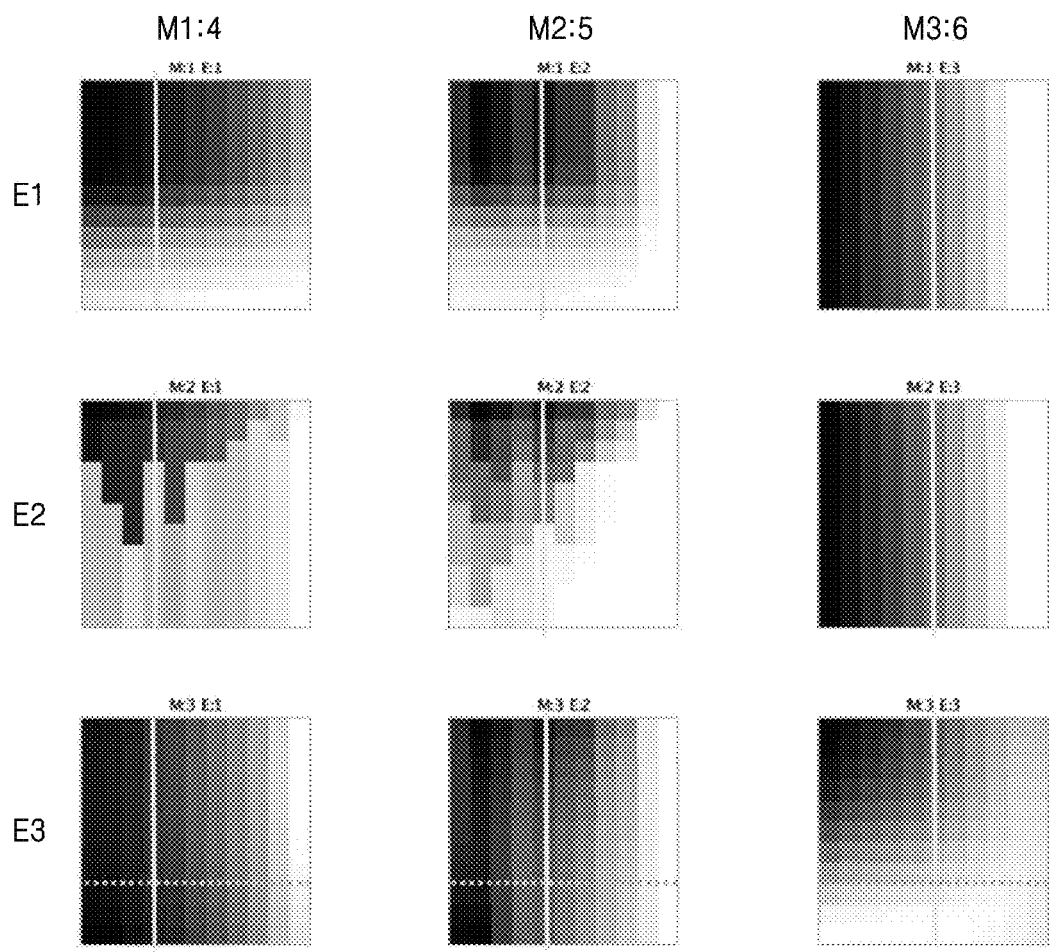
FIG. 18 is a reference diagram emphasizing an evaluation score calculated in the image quality improvement table of FIG. 17.

FIG. 18 is a reference diagram emphasizing an evaluation score calculated in the image quality improvement table of FIG. 17. In the process of determining a weight of each improvement algorithm, the processor 120 may use the sum or average of improvement degrees for the improvement algorithm with respect to each evaluation item. For example, the processor 120 may determine a weight in the case of the sum or average of improvement degrees of an improvement algorithm being greatest as a weight of the improvement algorithm. This is because the improvement algorithm may affect each of the evaluation items M1, M2, and M3.

Figure 19:
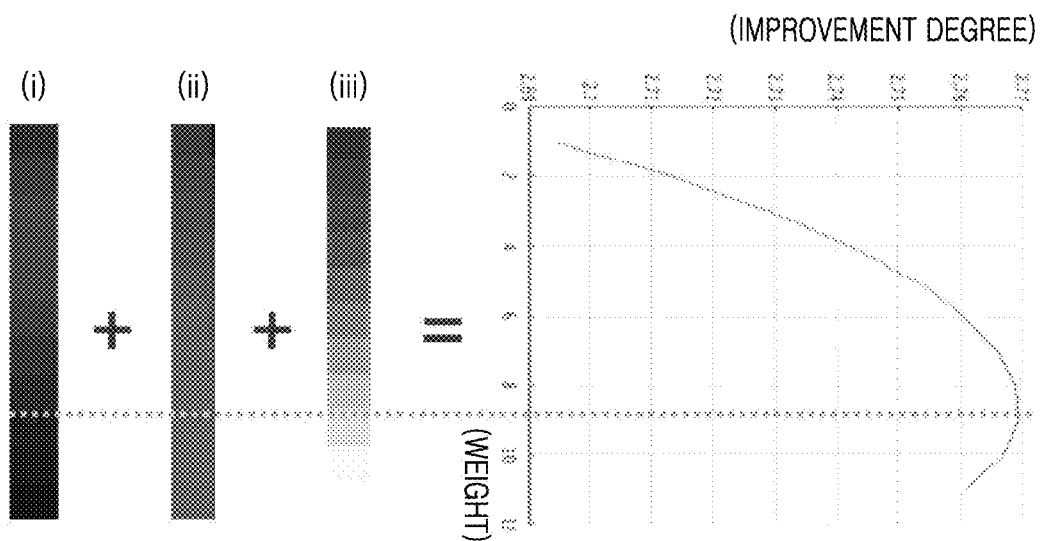
FIG. 19 is a reference diagram illustrating the sum of improvement degrees corresponding to evaluation scores of evaluation items.

FIG. 19 is a reference diagram illustrating the sum of improvement degrees corresponding to evaluation scores of evaluation items. In FIG. 19, (i) represents an improvement degree corresponding to a grade 4 that is an evaluation score of a first evaluation item M1 with respect to a third improvement algorithm E3, (ii) represents an improvement degree corresponding to a grade 5 that is an evaluation score of a second evaluation item M2 with respect to the third improvement algorithm E3, and (iii) represents an improvement degree corresponding to a grade 6 that is an evaluation score of a third evaluation item M3 with respect to the third improvement algorithm E3. Also, (iv) represents the sum of weight-by-weight improvement degrees of the third improvement algorithm E3. The processor 120 may determine a weight in the case of the sum of improvement degrees being maximum as a weight of the third improvement algorithm E3.

The above method of processing by applying the improvement algorithm to the biometric image may also be applied to all the biometric images acquired from the biometric sensor 110; however, the inventive concept is not limited thereto. It may also be applied to some biometric images among the biometric images acquired from the biometric sensor 110. For example, in the case of registering a biometric image as an authentication template, the biometric image may be corrected and registered as described above. Meanwhile, in the case of authenticating the biometric image acquired from the biometric sensor 110, the biometric image may be corrected with respect to the biometric image failing to be authenticated.

Figure 20:
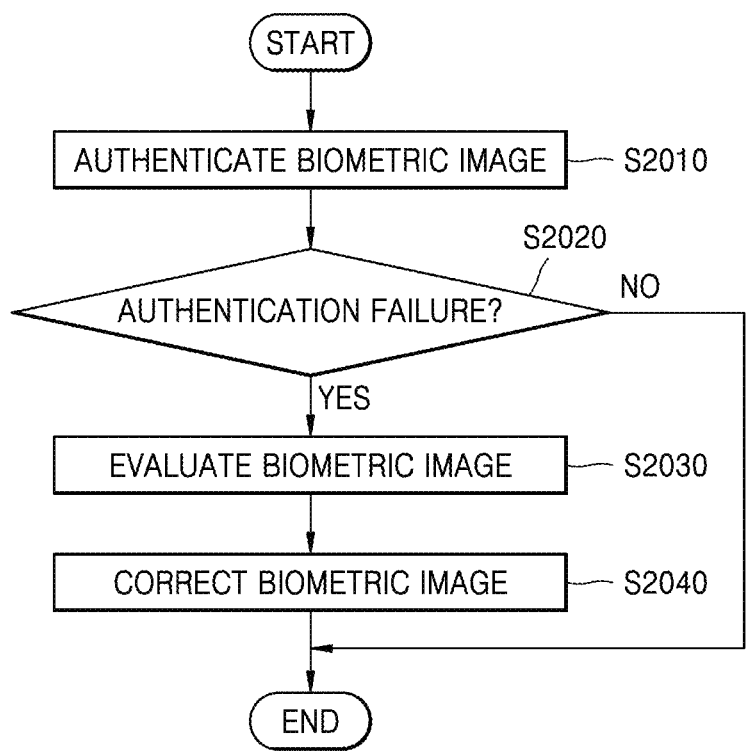
FIG. 20 is a reference diagram illustrating a biometric image processing method according to another embodiment.

FIG. 20 is a reference diagram illustrating a biometric image processing method according to another embodiment. Referring to FIG. 20, the processor 120 may authenticate a biometric image (S2010). The processor 120 may authenticate the biometric image by comparing a biometric image acquired from the biometric sensor 110 with an authentication template registered in the memory 130. The authentication template may be a template image prestored in the memory. For example, when the similarity between the biometric image and the registered authentication template is equal to or greater than a first reference value, the processor 120 may determine that the authentication has succeeded by considering that the biometric image is identical to the authentication template. However, when the similarity between the biometric image and the registered authentication template is smaller than the first reference value, the processor 120 may determine that the authentication has failed by considering that the biometric image is different from the authentication template.

In response to determining that the authentication has not failed (S2020—NO), the processor 120 skips the biometric image evaluation process. In response to determining that the authentication has failed (S2020—YES), the processor 120 may evaluate the biometric image (S2030). A method of evaluating the biometric image has been described above. In brief, the processor 120 may evaluate the biometric image with respect to each evaluation item and calculate an evaluation score with respect to each evaluation item. The above evaluation item may include a noise, an artifact, and/or a brightness deviation. Also, the evaluation score may include information about an authentication rate in addition to a pixel value. Based on the evaluation result, the processor 120 may determine at least one of an improvement algorithm for improving at least one of an authentication rate and an image quality of the biometric image and a weight of the improvement algorithm.

The processor 120 may correct the biometric image by the determined improvement algorithm (S2040). When there are a plurality of improvement algorithms, the processor 120 may apply the improvement algorithms sequentially one by one. Also, it may correct the biometric image by applying some improvement algorithms and then evaluate the corrected biometric image. Also, when the evaluation score is lower than a second reference value, it may correct the biometric image by applying the other improvement algorithms. However, after correcting the biometric image by applying some improvement algorithms, when an evaluation score of the corrected biometric image is equal to or greater than a second reference value, it may again authenticate the corrected biometric image without applying the other improvement algorithms.

As above, it may be possible to adaptively determine the improvement algorithm that may improve the authentication rate and the image quality with respect to each evaluation item by using the image quality improvement table. Also, it may be possible to increase an authentication rate of the corrected biometric image by the determined improvement algorithm.

Since the result of evaluating the biometric image includes not only an image quality but also information about an authentication rate, the authentication rate of the corrected biometric image may also be improved.

Since an improvement algorithm and a weight of the improvement algorithm may be adaptively applied with respect to each evaluation item, the biometric image may be corrected more efficiently.

The above apparatus 100 processing a biometric image may be an independent apparatus 100 or may be an electronic apparatus 100 including other functions. For example, the electronic apparatus 100 may include, but is not limited to, desktop computers, portable phones, smart phones, notebook computers (laptop computers), tablet personal computers (PCs), e-book terminals, digital broadcasting terminals, personal digital assistants (PDAs), portable multimedia players (PMPs), navigation apparatuses, MP3 players, digital cameras, Internet protocol televisions (IPTVs), digital televisions (DTVs), and consumer electronics (CE) devices (e.g., air conditioners and refrigerators with display apparatuses). The electronic apparatus 100 may be a wearable device 100 that may be worn by an object. For example, the electronic apparatus 100 may include wristwatches, spectacles, rings, wristlets, and necklaces. Alternatively, the electronic apparatus 100 may be an Internet of Things (IoT) apparatus 100 including the biometric sensor 110.

The inventive concept has been described above with reference to embodiments. However, those of ordinary skill in the art will understand that various changes in form and details may be made therein without departing from the spirit and scope of the inventive concept as defined by the appended claims. Therefore, the above embodiments should be considered in descriptive sense only and not for purposes of limitation. Thus, the scope of the inventive concept may be defined not by the above detailed descriptions but by the appended claims, and all differences within the scope will be construed as being included in the inventive concept.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of processing a biometric image, the method comprising:
   acquiring a biometric image from a biometric sensor;
   evaluating image quality of the biometric image by calculating a plurality of evaluation scores, each of the plurality of evaluation scores independently corresponding to one of a plurality of evaluation items corresponding to the biometric image, and each of the plurality of evaluation scores calculated based on an authentication rate;
   determining at least one of an improvement algorithm corresponding to each of the plurality of evaluation scores and a weight of the improvement algorithm by using an image quality improvement table comprising an improvement degree of image quality; and
   correcting the biometric image according to the at least one of the improvement algorithm and the weight of the improvement algorithm.

2. The method of claim 1, wherein the evaluating the image quality of the biometric image comprises:
   calculating a plurality of evaluation values of the biometric image with respect to each of the plurality of evaluation items, based on a pixel value of the biometric image; and
   converting the plurality of evaluation values into the plurality of evaluation scores.

3. The method of claim 2, wherein the converting of the plurality of evaluation values into the plurality of evaluation scores comprises:
   calculating a correlation between the respective evaluation value and the respective authentication rate by linear regression.

4. The method of claim 3, wherein the authentication rate is based on a similarity between images which are similar in terms of the evaluation value.

5. The method of claim 1, wherein the image quality improvement table represents an improvement degree according to an evaluation item and an improvement algorithm.

6. The method of claim 5, wherein the image quality improvement table comprises:
a first image quality improvement table representing a first improvement degree according to a first evaluation item and a first improvement algorithm;
a second image quality improvement table representing a second improvement degree according to the first evaluation item and a second improvement algorithm;
a third image quality improvement table representing a third improvement degree according to a second evaluation item and a third improvement algorithm; and
a fourth image quality improvement table representing a fourth improvement degree according to the second evaluation item and a fourth improvement algorithm.

7. The method of claim 1, wherein the improvement degree is subdivided by at least one of grade of the evaluation item and weight of the improvement algorithm.

8. The method of claim 1, wherein the improvement degree comprises an expected evaluation score of the biometric image when a particular improvement algorithm of a particular weight is applied to a biometric image having a particular grade of a particular evaluation item.

9. The method of claim 1, wherein the determining the at least one of the improvement algorithm corresponding to the plurality of evaluation scores and the weight of the improvement algorithm comprises:
determining the improvement algorithm based on a comparison between the plurality of evaluation scores and the improvement degree; and
determining the weight of the improvement algorithm by using the image quality improvement table.

10. The method of claim 9, wherein the determining of the improvement algorithm comprises:
determining, as the improvement algorithm, an improvement algorithm of the image quality improvement table when an improvement degree corresponding to one of the plurality of evaluation scores from the image quality improvement table is equal to the respective evaluation score or greater than the respective evaluation score by a first reference value.

11. The method of claim 9, wherein the determining of the weight comprises:
determining, as the weight, a weight in a case where a sum or an average of the improvement degree with respect to each evaluation item in the image quality improvement table is a maximum sum or average.

12. The method of claim 1, wherein the determining of the at least one of the improvement algorithm and the weight of the improvement algorithm is performed when at least one of the plurality of evaluation scores with respect to each of the plurality of evaluation items is equal to or smaller than a second reference value.

13. The method of claim 1, wherein the calculating the evaluation score with respect to each of the plurality of evaluation items corresponding to the biometric image comprises:
calculating a first evaluation score corresponding to a first evaluation item, which represents a first type of image quality of the biometric image, and
calculating a second evaluation score corresponding to a second evaluation item, which represents a second type of image quality of the biometric image.

14. The method of claim 1, wherein the determining the at least one of the improvement algorithm corresponding to the evaluation score and the weight of the improvement algorithm comprises:
obtaining a first improvement algorithm and a first weight for the first improvement algorithm based on the first evaluation score; and
obtaining a second improvement algorithm and a second weight for the second improvement algorithm based on the second evaluation score.

15. An electronic apparatus comprising:
a biometric sensor configured to detect a biometric image from an object; and
a processor configured to:
acquire the biometric image from the biometric sensor,
evaluate image quality of the biometric image by calculating a plurality of evaluation scores, each of the plurality of evaluation scores independently corresponding to one of a plurality of evaluation items corresponding to the biometric image, and each of the plurality of evaluation scores calculated based on an authentication rate;
determine at least one of an improvement algorithm corresponding to each of the plurality of evaluation scores and a weight of the improvement algorithm by using an image quality improvement table comprising an improvement degree of image quality; and
correct the biometric image according to the determined at least one of the improvement algorithm and weight of the improvement algorithm.

16. The electronic apparatus of claim 15, wherein the processor is further configured to:
calculate a plurality of evaluation values of the biometric image with respect to each of the plurality of evaluation items, based on a pixel value of the biometric image; and
convert the plurality of evaluation values into the plurality of evaluation scores.

17. The electronic apparatus of claim 16, wherein the processor is further configured to:
convert the plurality of evaluation values into the plurality of evaluation scores by calculating a correlation between the respective evaluation value and the respective authentication rate by linear regression.

18. The electronic apparatus of claim 17, wherein the authentication rate is based on a similarity between images that are similar in terms of the evaluation value.

19. The electronic apparatus of claim 15, wherein the image quality improvement table represents an improvement degree according to an evaluation item and an improvement algorithm.

20. The electronic apparatus of claim 19, wherein the improvement degree is subdivided by at least one of grade of the evaluation item and weight of the improvement algorithm.

21. The electronic apparatus of claim 19, wherein the improvement degree comprises an expected evaluation score of the biometric image when a particular improvement algorithm of a particular weight is applied to a biometric image having a particular grade of a particular evaluation item.

22. The electronic apparatus of claim 15, wherein the processor is further configured to:
determine the improvement algorithm based on a comparison between the plurality of evaluation scores and the improvement degree; and determine the weight of the improvement algorithm by using the image quality improvement table.

23. The electronic apparatus of claim 22, wherein the processor is further configured to:
determine, as the improvement algorithm, an improvement algorithm of the image quality improvement table when an improvement degree corresponding to one of the plurality of evaluation scores from the image quality improvement table is equal to the respective evaluation score or greater than the respective evaluation score by a first reference value.

24. The electronic apparatus of claim 22, wherein the processor is further configured to:
determine, as the weight, a weight in a case where a sum or an average of the improvement degree with respect to each evaluation item in the image quality improvement table is a maximum sum or average.

25. The electronic apparatus of claim 15, wherein the processor is further configured to:
determine the at least one of the improvement algorithm and the weight of the improvement algorithm when at least one of the plurality of evaluation scores with respect to each of the plurality of evaluation items is equal to or smaller than a second reference value.

26. The electronic apparatus of claim 15, wherein the processor is further configured to authenticate the corrected biometric image by comparing the corrected biometric image with an authentication template.

27. The electronic apparatus of claim 15, wherein the biometric image comprises one of a fingerprint image, an iris image, a sweat gland image, a blood vessel image, and a face image.

28. An electronic apparatus comprising:
a processor configured to:
acquire an image,
calculate a plurality of evaluation scores, each of the plurality of evaluation scores independently corresponding to one of a plurality of evaluation items corresponding to the biometric image, and each of the plurality of evaluation scores calculated based on an authentication rate,
determine an improvement algorithm corresponding to each of the plurality of evaluation scores, and
correct the image according to the determined improvement algorithm.

\* \* \* \* \*